United States Patent Office

3,413,364
Patented Nov. 26, 1968

3,413,364
HYDROHALOGENATION OF MYRCENE
Jack H. Blumenthal, Oakhurst, N.J., assignor to International Flavors & Fragrances, Inc., New York, N.Y., a corporation of New York
No Drawing. Filed Mar. 9, 1966, Ser. No. 532,842
9 Claims. (Cl. 260—654)

ABSTRACT OF THE DISCLOSURE

This invention has to do with a process for the selective production of myrcenyl halides by reacting myrcene with hydrogen halides in the presence of certain Lewis acids and/or a high surface area catalysts. The Lewis acid catalysts which are useful in the practice of this process are antimony trichloride, mercuric chloride, bismuth trichloride, stannous chloride, tin, zinc acetate, zinc octanoate, and arsenic oxide. The high surface area materials which are useful as catalysts in this process are silica gel, silicic acid, activated carbon, and activated alumina.

---

This invention relates to hydrohalogenation of myrcene and a novel product obtained thereby, and more particularly, it relates to a process for the preparation of myrcenyl halides in high yield.

Myrcenyl halides are useful materials in the preparation of fragrances, perfumes, and the like. As used herein, "myrcenyl halide" means 2-halo-2-methyl-6-methylene-7-octene. These halides are readily converted, as by hydrolysis, into the corresponding alcohol and thence into its esters.

It is known that the addition of hydrogen halide of myrcene in the absence of a catalyst leads to a mixture of hydrohalides containing roughly equal amounts of myrcenyl, linalyl, α-terpinyl, and geranyl halides, as shown for example in British Patent 896,262. It is also known to hydrohalogenate myrcene in the presence of certain copper containing materials, as shown in U.S. Patent 2,882,323 to improve the yield of allylic halides such as linalyl and geranyl halide in preference to myrcenyl halide. It will be understood herein, that the term "geranyl halide" includes a mixture of geranyl and neryl halides.

It is an object of this invention to provide a process which selectively will produce high yields of myrcenyl halides as opposed to allylic halides such as linalyl and geranyl halide. In particular it is an object of this invention to provide a process which selectively makes myrcenyl chloride.

Further and more specific objects, features, and advantages will clearly appear from the detailed description given below.

The invention comprises the novel compositions and component mixtures comprised in such compositions, as well as the novel processes and steps of processes according to which such compositions may be manufactured, specific embodiments of which are described hereinafter by way of example only and in accordance with what is now considered the preferred manner of practicing the invention.

Briefly, the process of this invention comprises reacting myrcene with hydrogen halide in the presence of a Lewis acid catalyst of the type more fully described below and/or a high surface area catalyst to produce myrcenyl halide. The myrcenyl halide can be recovered from the reaction product by conventional techniques including filtration to remove the catalyst, selective extraction, and fractionation.

The catalysts utilized in the practice of this invention function to promote the addition of the hydrogen halide to the isolated double bond of myrcene and thereby yield myrcenyl chloride as the main product instead of hydrohalogenating the conjugated system to produce other isomers. It will be understood that the process of this invention is applicable both to pure myrcene and to the commercial material and, unless otherwise indicated, "myrcene" as used herein includes the pure material, purified commercial myrcene, and commercial myrcene. The commercial myrcene contains about 20-30% of substances other than myrcene, limonene generally being the chief impurity. Because of these impurities, commercial myrcene does not produce only the myrcenyl halide, but rather it also yields about 20-30% α-terpinyl halides and up to 10% of a mixture containing linalyl and geranyl halides.

The hydrohalogenation is carried out in the presence of Lewis acid catalysts, a high surface area catalyst, or a combination of these two materials. As used herein, the term "Lewis acid" means a Lewis acid (an electron pair acceptor) being a metal salt in which the metal has a valence of at least two and is selected from any of Group II (b) through V (b) of the Periodic Table.

The preferred Lewis acid catalysts for use in this invention can be considered "mild" Lewis acids and include zinc alkyl carboxylic acid salts having from about one to about eighteen carbon atoms such as zinc acetate and zinc octonate, metals which behave as Lewis acids under the reaction conditions such as powdered tin, and chlorides of metals which act as Lewis acids under the reaction conditions such as stannous chloride, bismuth trichloride, mercuric chloride, arsenic oxide and antimony trichloride. These materials can also be used in various combinations.

Although strong Lewis acids such as boron trifluoride, aluminum chloride, and stannic chloride can be used they are not preferred since they tend to lead toward undesirable side reactions such as the polymerization of myrcene and so reduce the conversion to the desired useful reaction product. On the other hand although weak Lewis acids can be used they are generally less desirable since they tend to be less selective in producing the desired myrcenyl halide.

The proportion of the Lewis acid catalyst can vary over a relatively wide range according to the particular temperature, the rate of halide addition, the relative strength of the Lewis acid, and the other reaction conditions chosen. For example, the more active Lewis acids have a tendency to polymerize the myrcene when they are used at very high concentrations, while very low concentrations of even the more active catalysts require a very low rate of hydrogen halide addition in order to minimize undesirable reactions at the conjugated double bond system. Accordingly, preferred catalyst concentrations are from about 0.1 to about 10% of the myrcene. All parts, proportions, percentages, and ratios herein are by weight, unless otherwise indicated.

Certain high surface area materials are also useful to catalyze the addition of the hydrogen halide to the isolated double bond in preference to the conjugated double bond system. Depending upon the high surface area material chosen, a small particle size is generally necessary to attain reasonable reaction rates. Accordingly, particle sizes in the range of from about 30- to about 300-mesh U.S.S. are preferred. The high surface area catalysts can be reused a number of times in this process without requiring reactivation.

The preferred high surface area materials for use in the practice of this invention are silica gel, silicic acid, activated carbon, and activated alumina. It has been found that with these high surface area materials a generally greater quantity must be used than that required with a Lewis acid catalyst in order to obtain a reasonable rate of reaction. Accordingly, the preferred high surface area catalyst concentrations are from about 10 to about 50% by weight of the myrcene.

It has also been found that a combination of a Lewis acid and a high surface area material is especially advantageous for use as a catalyst in this process. The amount of catalyst required when high surface area materials are used alone or in conjunction with a Lewis acid catalyst can vary over a wide range depending on a number of factors including the reaction temperature used, the amount of Lewis acid, if any, employed in conjunction with high surface area material, and the rate of hydrogen halide addition. Where the Lewis acid-high surface area material combination is used, the amount of high surface area catalyst required will be of the order used for the high surface area material alone, although somewhat lower quantities can be used as compared to when the high surface area materials are utilized by themselves.

It will be understood herein that the hydrogen halide is preferably added to the myrcene in anhydrous form. It is most convenient to contact the hydrogen halide in gaseous form with the liquid material, as for example by bubbling or sparging the hydrogen halide through the myrcene, or contacting the gas and liquid in a bubble cap column or other gas-liquid contact device.

In order to avoid polymerization, oxidation and other undesirable side reactions unrelated to the hydrohalogenation it is preferred that an inhibitor be present in the myrcene during this step of the process. The inhibitor employed should be one which represses any undesirable side reactions and does not interfere with the desired hydrohalogenation addition or any subsequent reaction steps, e.g. hydrolysis, to which the desired reaction product, myrcenyl halide, will be subjected. Exemplary of the inhibitors found useful are the quinone or phenolic type of inhibitors. Such inhibitors for addition to the myrcene include hydroquinone, 4-hydroxymethyl-2,6-di-t-butylphenol, and 2,2'-methylenebis (4-methyl-6-t-butylphenol).

The temperature at which the hydrohalogenation is carried out can vary over a wide range depending upon the particular catalyst or catalysts used, the desired rate of reaction, and the extent to which side reactions can be tolerated. Generally, lower temperatures decrease the rate at which the hydrogen halide can be added, while higher temperatures tend to cause undesirable side reactions. It is accordingly advantageous that the hydrohalogenation be carried out in the range of from about −20° to about 50° C. The preferred range for use in this process is from about 0° to about 20° C.

The time required for the reaction is variable and can be controlled by the rate of addition of the hydrogen halide. Generally the optimum rate of addition of the hydrogen halide varies with the concentration and efficiency of the catalyst. The hydrogen halide is desirably added at a rate such that the reaction is carried out in from 3 to about 15 hours.

The mixture of alcohols of which myrcenol is the major constituent can be obtained by hydrolysis of the halide, desirably in the presence of a base, preferably an aqueous base. Preferred basic materials are alkali-metal and alkaline earth metal carbonates and hydroxides. The alcohols so produced can be used as obtained or treated by well-known methods to obtain various esters of great value in the preparation of fragrances, perfumes, and other compositions. In addition, the myrcenyl halide or the myrcenyl alcohol obtained upon hydrolysis can be further treated to obtain purified or pure materials.

It has further been found that myrcene can be hydrohalogenated in the presence of a Lewis acid catalyst or a high surface area catalyst or a combination of these two catalysts and the reaction products subsequently hydrolyzed to produce products containing a novel cyclohexanol derivative. This novel cyclohexanol derivative, 3,3-dimethyl-1-vinylcyclohexanol, has an $n_D^{20}$ of 1.4720; a mass spectrographically determined molecular weight of 154; the following absorptions as determined by a film infrared spectogram obtained with salt (NaCl) plates: hydroxyl at 2.94μ, gem-dimethyl at 7.22 and 7.27μ, and vinyl at 3.28, 6.10, 7.08, 10.08, and 11.90μ; and the structure:

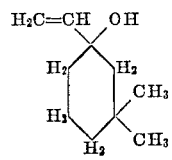

This cyclohexanol derivative is useful in the synthesis of related esters and other cyclohexanol derivatives. Its pertinent nuclear magnetic resonance assignments are shown in Table I:

TABLE I

| | Chemical shift (p.p.m. from TMS) | Multiplicity |
|---|---|---|
| HC=CH$_2$ | 6.16–5.85 | ABX. |
| CH$_2$—C—O | 1.16–1.38 | Multiplet. |
| —CH$_2$— | 1.28 | Broad singlet. |
| CH$_3$\C/CH$_3$ | 1.05–0.85 | 2 singlets. |

The spectra were measured on a Varian A–60 NMR Spectrometer with a CCl$_4$ solution of the sample and tetramethylsilane (TMS) as an internal reference.

The same catalyst as above is used under the same conditions of time, temperature, and mode of addition of hydrogen halide set forth supra. The hydrolysis to obtain the material is carried out with a base, as described above.

The following examples are given to illustrate preferred embodiments of this invention as it is now preferred to practice it. Although hydrogen chloride is shown as the preferred hydogen halide, another halide such as hydrogen bromide can be used. It will be understood that these examples are illustrative and the invention is not to be considered as restricted thereto except as indicated in the appended claims.

EXAMPLE I

A mixture of 5 moles of commercial myrcene (containing about 75% pure myrcene), 135 g. of carbon containing 10% mercuric chloride as purchased from Harshaw Chemical Company of Cleveland, Ohio, and ground to pass through 100-mesh U.S.S., and 5 g. of "Ionox" (4-hydroxymethyl-2,6-di-t-butyl-phenol) is brought to 5° C., and 5.3 moles anhydrous hydrogen chloride is bubbled through the mixture over a 6.5-hour period while the temperature is maintained at 5–10° C. The reaction mixture so obtained is analyzed by gas-liquid chromatography (GLC) and in addition to unreacted hydrocarbons, the following percentages of chloride are found based on the chlorides shown:

| Chloride | Amount, percent |
|---|---|
| Linalyl | 5.0 |
| Myrcenyl | 77.0 |
| α-Terpinyl | 16.0 |
| Geranyl | 2.0 |

The catalyst is removed from the reaction mixture by filtration, and the filter cake is washed with benzene. The combined benzene wash and original filtrate is hydrolyzed by stirring with a mixture of 5 liters water, 550 g. sodium bicarbonate, 17 cc. "Phi-o-sol" (sulfonated acid ester sodium salt made by Onyx Chemical Corporation), and 35 g. "Ionox" for 6 hours at a temperature of 85–90° C. The organic layer is separated from the hydrolysis mixture, washed with water, and heated to strip off the benzene. The residual organic layer obtained after stripping weighs 990 g.

The residual material is fractionated to yield a forerun of 340 g. containing 72.7% myrcene (1.8 moles) and 417 g. of an alcohol fraction assaying 81.4% 10-carbon atom alcohols. This is 69% of the theoretical yield, based on the myrcene consumed. A GLC analysis indicates a 52% myrcenol content in the alcohol mixture.

EXAMPLE II

A mixture of 920 g. of commercial myrcene (74% pure), 9 g. powdered tin, and 30 g. "CAO-5" [2,2'-methylene-bis(4-methyl-6-t-butylphenol) made by Catalin Corporation] is brought to 5° C., and 5.3 moles gaseous hydrogen chloride is bubbled through the mixture with vigorous stirring during a 5.5-hour period while the temperature is maintained at 5–10° C. A GLC analysis of the reaction mixture shows the following percentages of chlorides, based on the chlorides shown:

| Chloride | Amount, percent |
|---|---|
| Linalyl | 2.0 |
| Myrcenyl | 71.0 |
| α-Terpinyl | 23.0 |
| Geranyl | 4.0 |

The reaction mixture so obtained is added to a hydrolysis mixture of 5 liters water, 550 g. sodium bicarbonate and 17 cc. Phi-o-sol (sulfonated acid ester sodium salt). The mass is stirred at a temperature of 85–90° C. for 6 hours and allowed to stand overnight. The organic layer so obtained is washed twice with water, and 950 g. is obtained. The hydrolyzed reaction mixture is fractionated to obtain 350 g. of an alcohol mixture assaying 85% 10-carbon atom alcohols. About 1.7 moles of myrcene are present in the forerun of the fractionation. The mixture of alcohols is analyzed by vapor phase chromatography and found to contain 58% myrcenol.

EXAMPLE III

A mixture of 5 moles of commercial myrcene (75% purity), 136 g. 100-mesh silicic acid, and 5 g. "Ionox" (4-hydroxymethyl-2,6-di-t-butylphenol) is prepared, and 5.3 moles gaseous hydrogen chloride are added to the mixture over a period of 6.5 hours while the mixture is maintained at 5–10° C. A GLC analysis of the reaction mixture shows the following distribution of chlorides, based on the chlorides shown:

| Chloride | Amount, percent |
|---|---|
| Linalyl | 6.0 |
| Myrcenyl | 63.0 |
| α-Terpinyl | 27.0 |
| Geranyl | 4.0 |

The reaction mixture is filtered to remove the catalyst and the filter cake is washed with benzene. The combined benzene extract and original filtrate is hydrolyzed as in Example II to obtain 898 g. of crude hydrolyzed reaction mixture. The crude mixture is fractionated to obtain 332 g. of a forerun containing 73.8% myrcene and 509 g. of an alcohol mixture assaying 70.7% 10-carbon atom alcohol. GLC and ultraviolet analyses indicate that the alcohol mixture contains 50% myrcenol.

EXAMPLE IV

A mixture of 5 moles of commercial myrcene (74% pure), 18 g. mercuric chloride, and 5 g. CAO-5 (2,2'-methylene-bis-4-methyl-6-t-butylphenol) is brought to 8° C., and 5.2 moles of gaseous hydrogen chloride is added during a 6.5 hour period while the temperature of the mixture is maintained at 5–10° C. GLC analysis of the reaction mixture shows the following chloride distribution, based on the chlorides shown:

| Chloride | Amount, percent |
|---|---|
| Linalyl | 6.0 |
| Myrcenyl | 59.0 |
| α-Terpinyl | 27.0 |
| Geranyl | 8.0 |

Hydrolysis as in Example I yields 967 g. of crude hydrolyzed reaction mixture which is fractionated to produce 461 g. of alcohol containing 44% myrcenol.

EXAMPLE V

A mixture of 5 moles of purified (i.e., fractionally distilled) myrcene (88% pure), 194 g. R-coarse grade activated carbon (obtained from Cliffs-Dow Co.), and 4.5 g. "Ionol" (4-hydroxymethyl-2,6-di-t-butylphenol) is prepared and 5 moles gaseous hydrogen chloride are added during a 4.5 hour period while the temperature is maintained at 5–10° C. The GLC analysis of the reaction mixture so obtained shows the following chloride distribution, based on the chlorides shown:

| Chloride | Amount, percent |
|---|---|
| Linalyl | 3 |
| Myrcenyl | 84 |
| α-Terpinyl | 10 |
| Geranyl | 3 |

The chlorides are hydrolyzed to the corresponding alcohols as in Example II.

Examples VI through XIV are shown in Table II. Commercial myrcene of about 75% purity is used in all the Table II examples. In all Table II examples, hydrogen chloride is added to the mixture of myrcene, catalyst, and inhibitor at 5–10° C. during 6–7 hours. The amounts of chloride are shown in the table, based on the four chlorides shown.

TABLE II

| Example | Catalyst | Percent chloride (by GLC) | | | |
|---|---|---|---|---|---|
| | | Linalyl | Myrcenyl | α-Terpinyl | Geranyl |
| VI | Zinc octanoate | | 78 | 22 | |
| VII | Zinc acetate | | 77 | 23 | |
| VIII | Stannous chloride | | 73 | 27 | |
| IX | Mercuric chloride | 6 | 62 | 26 | 6 |
| X | Antimony trichloride | 2 | 62 | 31 | 5 |
| XI | Bismuth trichloride | 9 | 60 | 30 | 1 |
| XII | Silica gel | 5 | 69 | 26 | |
| XIII | Activated alumina | 2 | 63 | 32 | 3 |
| XIV | Arsenic oxide | 12 | 58 | 27 | 3 |

What is claimed is:

1. A process which comprises reacting myrcene with hydrogen chloride in the presence of at least one catalyst selected from the group consisting of (i) a Lewis acid, selected from the group consisting of antimony trichloride, mercuric chloride, bismuth trichloride, stannous chloride, tin, zinc acetate, zinc octanoate, and arsenic oxide, and (ii) a high surface area material selected from the group consisting of silica gel, silicic acid, activated carbon, and activated alumina to produce 2-chloro-2-methyl-6-methylene-7-octene.

2. The process of claim 1 wherein a said Lewis acid catalyst is deposited on a said high surface area material.

3. The process of claim 2 wherein said catalyst is mercuric chloride deposited on activated carbon.

4. The process of claim 1 wherein said actalyst is tin.

5. The process of claim 1 wherein said catalyst is silicic acid.

6. The process of claim 1 wherein said catalyst is mercuric chloride.

7. The process of claim 1 wherein said catalyst is activated carbon.

8. The process of claim 1 wherein said catalyst is at least one of zinc octanoate, zinc acetate, stannous chloride, antimony trichloride, bismuth trichloride, arsenic oxide, silicic acid or silica gel.

9. The process of claim 1 wherein the reaction temperature is within the range of about −20° C. to 50° C.

References Cited

UNITED STATES PATENTS 2,882,323   4/1959   Weiss _____ 260—654

OTHER REFERENCES

Sconce et al.: Unit Processes in Org. Synthesis, pp. 243, 266–267, QD 262 G7 1958, C.6.

LEON ZITVER, *Primary Examiner.*

I. BOSKA, *Assistant Examiner.*